C. W. METCALF.
DEVICE FOR TAPPING AND CONTROLLING THE FLOW OF LIQUIDS IN PIPES.
APPLICATION FILED JULY 25, 1910.
997,464.
Patented July 11, 1911.
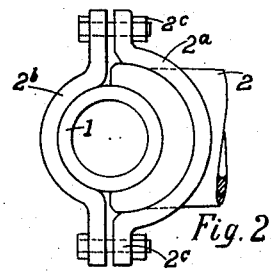
Fig. 2.
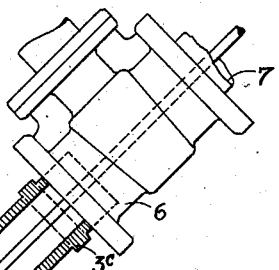
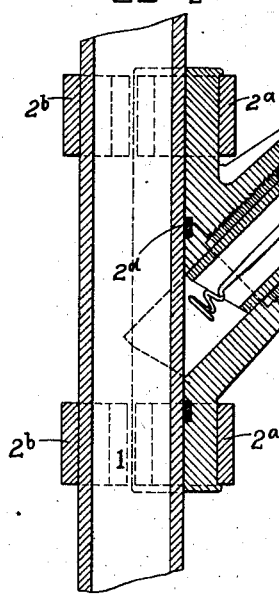
Fig. 1.
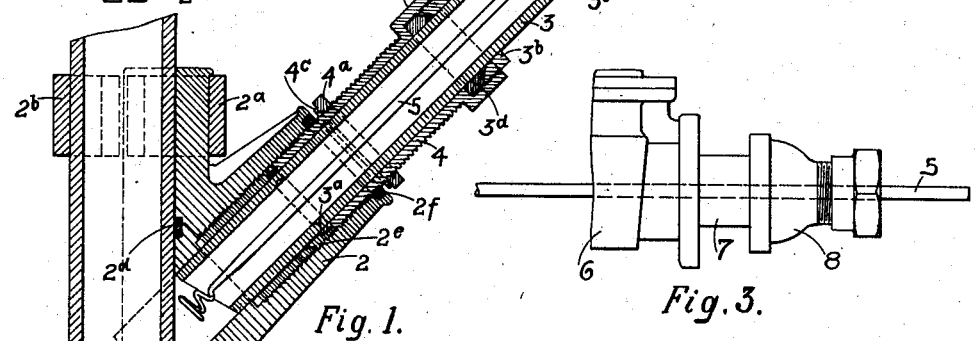
Fig. 3.
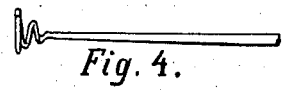
Fig. 5.  Fig. 4.
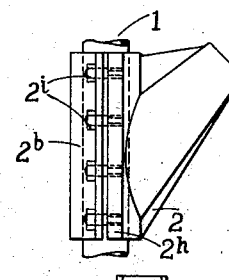
Fig. 8.
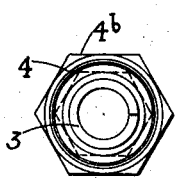
Fig. 7.
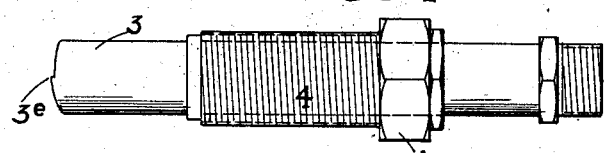
Fig. 6.
WITNESSES:
INVENTOR.
CHARLES W. METCALF.
BY
A. B. Bowman
ATTORNEY.

UNITED STATES PATENT OFFICE.

CHARLES W. METCALF, OF SAN DIEGO, CALIFORNIA.

DEVICE FOR TAPPING AND CONTROLLING THE FLOW OF LIQUIDS IN PIPES.

997,464.  Specification of Letters Patent.  Patented July 11, 1911.

Application filed July 25, 1910. Serial No. 573,632.

*To all whom it may concern:*

Be it known that I, CHARLES W. METCALF, a citizen of the United States, residing at San Diego, in the county of San Diego and State of California, have invented certain new and useful Improvements in Devices for Tapping and Controlling the Flow of Liquids in Pipes, of which the following is a specification.

My invention relates to devices for tapping, controlling and stopping the flow of liquids and gases under pressure in pipes and is more particularly adapted to controlling the flow of oil, gas and Artesian wells, as well as providing distribution lines from main pipe lines, and the objects of my invention are: First. To provide a simple, economical and easily operated device for tapping pipes when their contents are under pressure. Second. To provide means in said device for shutting off the flow through said tap. Third. To provide simple and efficient means for distributing the contents from larger pipes.

With these and other objects in view, as will appear in the detail description, my invention consists of certain novel features of construction, combination of parts, as hereinafter described and illustrated in the accompanying drawings and particularly set forth in the appended claims.

In the drawings Figure 1 is a sectional view of a portion of my device for tapping pipes, and inserting relief pipes therein, attached to the pipe to be relieved, Fig. 2 is a top view of a portion thereof, Fig. 3 is a detail side view, showing the extended portion of the device consisting of the portion of a valve, and a stuffing box in connection therewith, Fig. 4 is a detail view of the spring thrust rod, Fig. 5 is an end view thereof, Fig. 6 is a detail side elevational view of the cutter and feed, Fig. 7 is an end view thereof, and Fig. 8 is side elevational view of the clamps in a modified form.

Similar characters of reference refer to similar parts throughout the several views.

1 represents the main pipe, 2, a clamp thereon, 3 a cutter, 4 a feed piece, 5 a spring thrust-rod, 6 a valve, 7 a nipple, and 8 a stuffing box. On the side of main pipe 1, that it is desired to make a tap, is provided clamp piece 2, which is preferably attached to the main pipe 1, by means of clamps $2^a$ and $2^b$ as shown best in Fig. 2, which clamps said piece 2 to the main pipe 1 by means of bolts $2^c$. This clamp, however, may be made in a slightly modified form, as shown in Fig. 8, in which case the portion 2 of the clamp is provided with a flange $2^h$ and the portion $2^b$ extends the full length of piece 2, the two pieces 2 and $2^b$ as shown in Fig. 8 being clamped together by means of bolts $2^i$. On the inner surface of clamp piece 2 are provided gaskets $2^d$, which provide a tight inclosure adjacent to the hole cut in the main pipe. Clamp piece 2 is provided in its outward extending portion with a threaded hole $2^e$, extending nearly to main pipe 1 where it decreases in size, and is adapted to fit closely cutter 3. In the outer end of said threaded hole is provided a gasket $2^f$. Feed piece 4 is adapted to fit closely over cutter 3, the end bearing against collar $3^a$ on said cutter 3. Feed piece 4 is externally threaded adapted to fit the internal thread in clamp piece 2, and the outer end is provided with a hexagon extension $4^b$, adapted to fit a wrench. On the external thread on piece 4 is also provided a ring $4^a$ threaded internally and provided on its inner surface with an annular projection $4^c$, adapted to press into the gasket $2^f$, making the joints between elements 2 and 4 fluid tight. Around the cutter 3 is provided a ring $3^b$ threaded externally, adapted to fit the internal threads in a recess in the hexagon end of feed piece 4 and adapted to press gasket $3^d$, thus making the joint between cutter 3 and feed piece 4 fluid tight. The outer end of cutter 3 is threaded, and upon which is screwed a valve 6, and adjacent thereto is provided a hexagon $3^c$, adapted for a wrench for turning said cutter. The inner end of cutter 3 is provided with a cutter $3^e$, adapted to cut through the side of pipe 1. In the outer end of valve 6 is screwed nipple 7, onto which is screwed stuffing box 8. On the inside of cutter 3 and adapted to fit said stuffing box 8, is provided a thrust rod, on the inner end of which is provided a spiral spring, as shown best in Figs. 4 and 5, adapted to press against the outer wall of main pipe 1, and hold it against the pressure until the fluid from the inside of main pipe 1 enters the cutter 3, which equalizes the pressure, after which said spring thrusts the piece cut out by cutter toward the center of main pipe 1, allowing it to be thrown out by the pressure of the main pipe 1. The spring rod 5 is held in its relative position to the service pipe lengthwise by friction of the stuffing box 8 on its outer surface. Cutter 3 is left in the position shown by dotted lines in Fig. 1, thus the upper side acts as a guide for the fluid into the tap.

I have shown and described a particular construction but I do not wish to be limited to this particular construction, but desire to include in my invention the various changes that might be made therein, embodying the principal features of my invention as defined in the claims.

It will be readily seen that after clamping piece 2 on to main pipe 1 as described, with the pieces inserted therein, as shown in Fig. 1, including the nipple and stuffing box as shown in Fig. 3, and the feed piece 4 screwed into clamp 2 until the cutter edge engages with main pipe which is shown in Fig. 1, then turning cutter 3 by means of a wrench on hexagon 3$^c$, cutter 3 will cut its way through side of main pipe 1 being fed by means of a wrench, on the hexagon portion of feed piece 4, which piece thrusting against collar 3$^a$, on the cutter 3, will cause it to enter the pipe. Then the thrust rod 5 will thrust the piece cut out into the main pipe, after which thrust rod 5 is pulled backward past the valve, and the valve closed and stuffing box removed and the service pipe connected to the nipple.

Having thus described my invention, what I claim as new and desire to secure by Letters Patent is:—

1. A device of the character described, comprising a clamp, a service pipe provided with cutting means in connection therewith, means for feeding said service pipe, a valve on the extended end of said service pipe, a rod extending through said service pipe and valve, and a stuffing box on said rod at the extended end of said service pipe, all substantially as set forth.

2. A device of the character described, comprising a clamp provided with a threaded hole, a relief pipe equipped with the cutting end, means separate from the relief pipe for regulating the feed of said relief pipe, a valve on the extended end of said relief pipe, a spring thrust rod extending through said valve and relief pipe, and a stuffing box on the outer end, all substantially as set forth.

3. A device of the character described, comprising a clamp piece with an outward extension, means for clamping said clamp piece to a pipe, gaskets on the inner surface of said clamp piece, a combined cutter and service pipe adapted to operate in said clamp piece, means separate from the relief pipe in connection with said clamp piece and said combined cutter and service pipe for feeding the same, gasket means for making the joints fluid tight, means on said service pipe for facilitating its rotation, a valve on the outward extended end of said service pipe, a nipple in its outer end, a stuffing box on said nipple, and a spring thrust rod frictionally connected to said stuffing box and extending to the inner surface of said clamp piece, all substantially as set forth.

4. The combination in a device for regulating and stopping the flow of liquids and gases under pressure in pipes consisting of a pipe clamp, a relief pipe provided with a cutter on its lower end, a collar on said relief pipe, a separate feed piece against said collar threaded externally, means for providing tight joints between said service pipe and said feed means and said clamp portion, a valve on the extended end of said relief pipe, a stuffing box in connection therewith, and a spring thrust rod in said relief pipe, all substantially as set forth.

5. The combination in a device for controlling and stopping the flow of liquids and gases under pressure in pipes, consisting of a lateral extension piece, a clamp composed of two parts for clamping said piece to a main pipe, a relief pipe provided with a cutting device, a valve in said relief pipe, a spring thrust rod in said relief pipe, and a stuffing box on the extended end thereof, all substantially as set forth.

In testimony whereof, I have hereunto subscribed my name in the presence of two subscribing witnesses.

CHARLES W. METCALF.

Witnesses:
MELVIN E. METCALF,
CHARLES E. EDWARDS.

---

Copies of this patent may be obtained for five cents each, by addressing the "Commissioner of Patents, Washington, D. C."